Sept. 4, 1962 R. W. BISHOP 3,052,101
REFRIGERANT CHARGING CYLINDER ASSEMBLY
Filed March 10, 1960 3 Sheets-Sheet 1
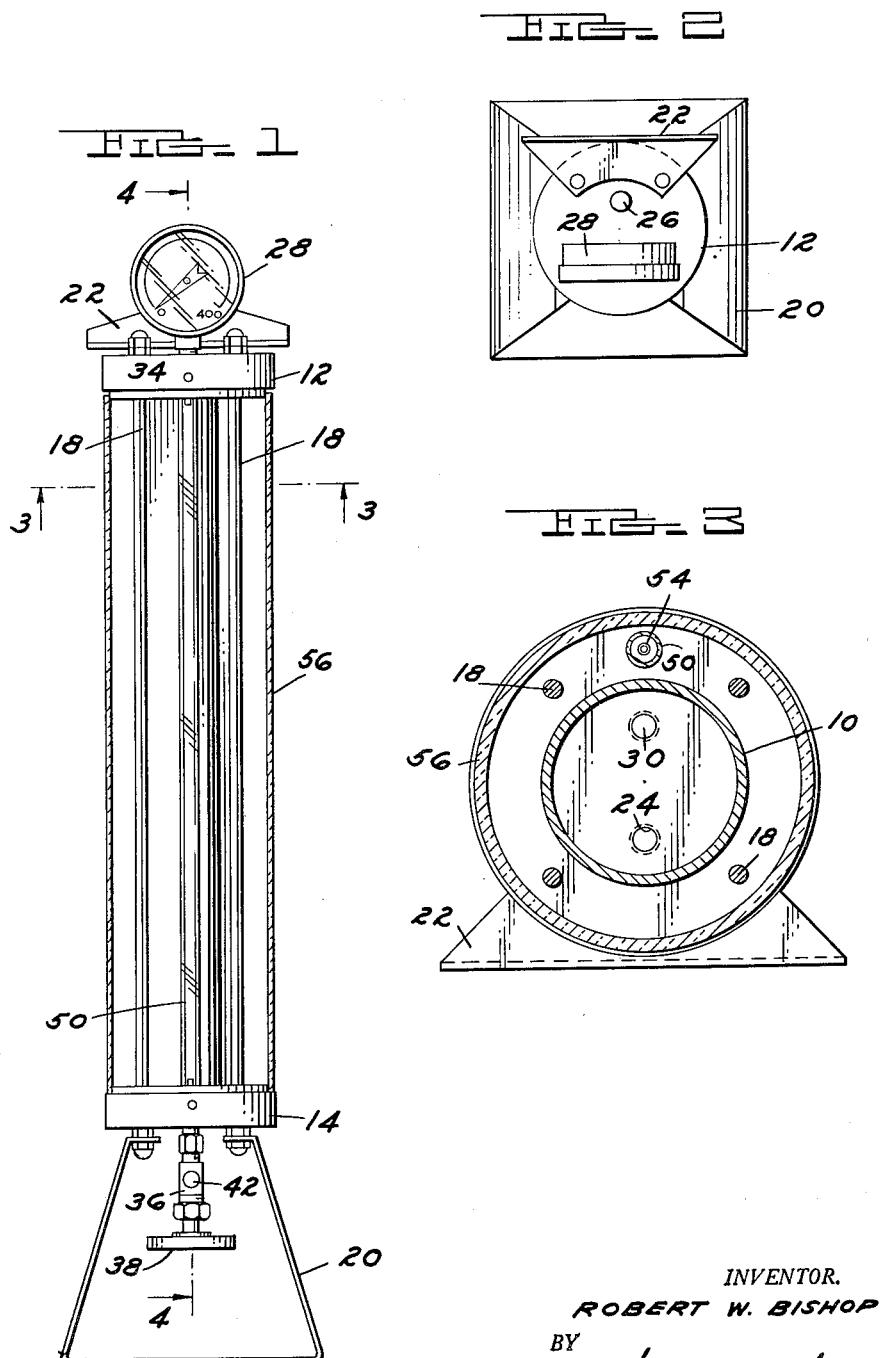
INVENTOR.
ROBERT W. BISHOP
BY
Burton & Parker
ATTORNEYS

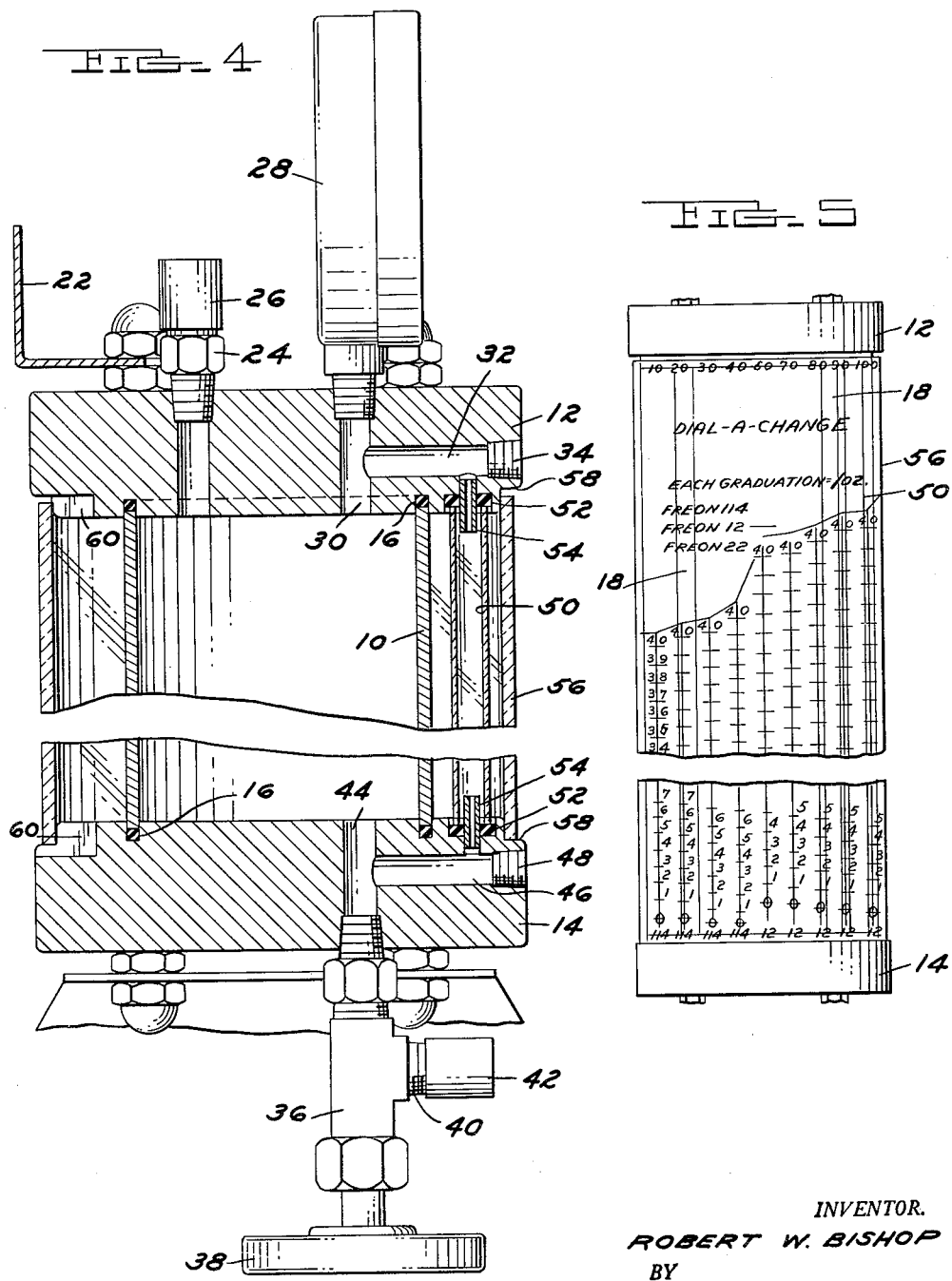

Sept. 4, 1962   R. W. BISHOP   3,052,101
REFRIGERANT CHARGING CYLINDER ASSEMBLY
Filed March 10, 1960   3 Sheets-Sheet 3

INVENTOR.
ROBERT W. BISHOP
BY
Burton & Parker
ATTORNEYS

United States Patent Office 3,052,101
Patented Sept. 4, 1962

3,052,101
REFRIGERANT CHARGING CYLINDER ASSEMBLY
Robert W. Bishop, Warren, Mich., assignor to Kent-Moore Organization, Inc., Warren, Mich., a corporation of Michigan
Filed Mar. 10, 1960, Ser. No. 14,088
12 Claims. (Cl. 62—49)

This invention relates to an improved refrigerant charging cylinder assembly whereby one can rapidly charge a refrigeratnig system with the correct amount of refrigerant required and as specified by the manufacturer.

An object is to provide a refrigerant charging mechanism capable of use in the field and adapted to be easily transported from one place to another, and to be detachably connected with the desired part of the refrigerating system for discharge of fluid refrigerant thereinto, and adapted to be readily filled with the desired fluid refrigerant, and easily operable to inject into the system an accurately measured amount of the desired fluid refrigerant.

An important feature of this invention is that it is simple in construction, inexpensive to build, readily portable, easily operable, and is so constructed that one can measure accurately by weight the specified amount of fluid refrigerant to be discharged without the necessity of calculations or reference to computation charts to figure the desired amount to be delivered into the system.

Another object is the provision of a device of the character specified which is safe and easy to use and protected not only against damage to the device but against accidental injury to the operator by breakage or explosion of the device. A meritorious feature of this charging cylinder assembly is that it is so constructed that should it be inadvertently overcharged, or should the pressure of the fluid therein contained build up to the danger point, the charging cylinder will not explode and injure the person using the same, but leakage will occur and such will be taken care of without resultant injury to anyone.

Another important object of the invention is that the refrigerant charging cylinder assembly is adapted to receive and discharge accurately measured increments of different kinds of fluid refrigerants which have different physical characteristics.

A further object of this invention is that the assembly includes a tank for containing fluid refrigerant, which tank is provided with a sight glass to visually indicate the level of the refrigerant contained within the tank, and is provided with a pressure gauge to indicate the pressure of the contained refrigerant and a pressure-volume chart carrying a plurality of scales, each of which scales is marked to indicate the determined increments of refrigerants at determined pressures, and each of which scales is adapted to be brought into position to be read against the sight glass, whereby the desired amount of refrigerant may be discharged from the charging tank.

An important feature of the invention is the provision of a chart associated with the charging cylinder and sight glass assembly, as set forth in the immediately preceding paragraph, which chart and sight glass of the assembly are relatively shiftable with respect to each other to bring into registration with the sight glass any one of a series of calibrations marked on the chart for each of a plurality of fluid refrigerants, in order that a desired amount of the selected refrigerant may be accurately measured and delivered into a refrigerating system.

Another important feature is that the chart provided with a plurality of scales or calibrations for selected refrigerants has the indications for each selected refrigerant so marked on the chart as to indicate the volume or weight of such refrigerant which would be delivered at any one of a selected number of refrigerant pressures.

Another meritorious feature is that the chart is formed of transparent material upon which the scales are marked, and such material is a tough material resistant to fracture. The chart itself may be shaped in the form of a tube or cylinder and supported as a part of the assembly to encircle the tank and the sight glass, and so supported as to be rotatably shifted to different positions with respect to the sight glass, to bring any one of the scales marked on the chart into position to be read against the sight glass.

Other objects and advantages will more fully appear from the following description, accompanying drawings, and claims.

FIG. 1 is a side elevation partly in section, showing the charge cylinder assembly.

FIG. 2 is a top plan view of the structure shown in FIG. 1.

FIG. 3 is a horizontal sectional view taken on the line 3—3 of FIG. 1.

FIG. 4 is a longitudinal sectional view partly broken away, showing in an enlarged design the structure shown in FIG. 1.

FIG. 5 is a broken away fragmentary side elevation of the charging cylinder showing the volume-pressure chart associated therewith.

Figure 6:
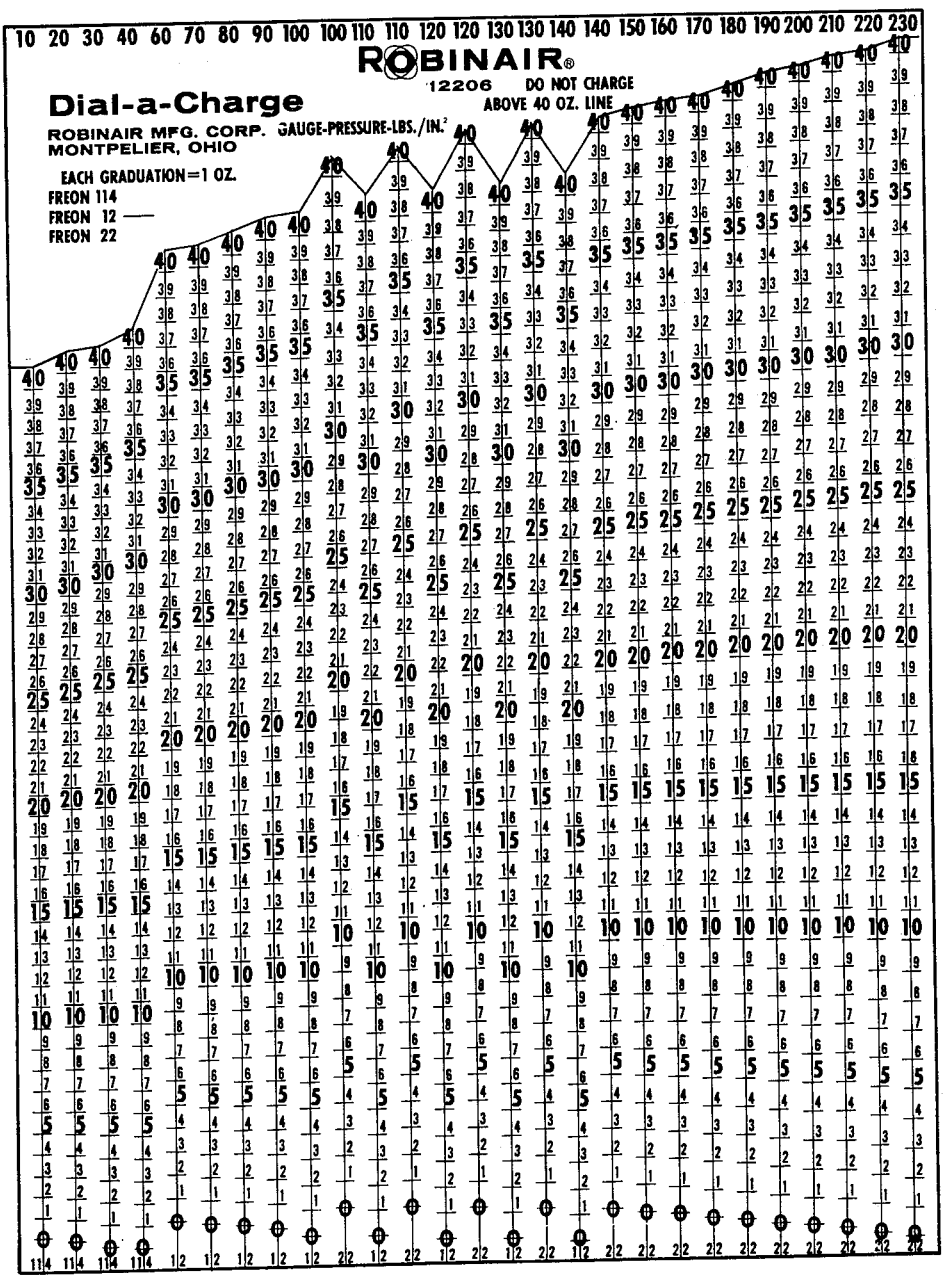
FIG. 6 shows the volume-pressure chart provided with the plurality of scales inscribed thereupon unrolled into a flat shape, so as to exhibit all of the figures on the chart.

The charging cylinder itself comprises, as shown particularly in the first four figures of the drawings, a seamless hermetically sealed steel cylinder 10 which forms the sidewall of the charging tank. This cylinder is closed at its top by an end cap 12 and at the bottom by an end cap 14, as shown most clearly in FIGURES 1 and 4. These end caps may be formed of aluminum or the like. The opposite ends of the open-ended steel cylinder are seated within grooves formed in the opposing faces of the end caps, and sealing gaskets 16 are seated within the grooves to form a fluid-tight seal. The opposite ends of the cylindrical assembly are held tightly together by a plurality of tension rods 18, four of which are shown in the cross section view of FIG. 3. These rods have their ends provided with threaded caps for assembly, disassembly, and adjustment of tension.

A suitable bracket 20 is secured to the bottom end plate 14, being held thereto by the tension rods hereinabove mentioned. This bracket serves as a stand to support the assembly in an upright position. It also serves as a protective enclosure about the valve mechanism hereinafter described which communicates through the end cap 14 with the interior of the tank. Another suitable steel bracket is attached to the top end plate as shown in FIG. 4 and indicated by the numeral 22. In FIG. 4 this bracket 22 is shown as broken away, but it extends as an open handle or a bail. This handle is provided for easy transportation of the equipment.

A bleeder valve 24 communicates through the top end plate 12 with the interior of the tank, and is adjustable upon removal of its cap 26 to permit the escape of gas from the tank when desired. Pressure gauge 28 surmounts the top end cap of the tank and communicates with the interior of the tank through a passageway 30 that extends through such top end cap. This passageway 30 has a branch 32 that is closed at the periphery of the end cap 12 by a plug 34 for a purpose hereinafter set forth.

The bottom end cap 14 is provided with a valve assembly comprising a valve body 36 and a manually adjustable handle portion 38 and an intake 40 leading into the valve body, which threaded intake is provided with a closure cap 42. This valve assembly is a conventional shutoff valve assembly. Upon removal of the end cap 42, a suitable intake or discharge coupling hose not shown in the drawing may be connected with the valve to permit discharge of fluid into or out of the tank. And such flow of fluid through the valve may be controlled by manipulation of the handle 38. The valve communicates with the interior of the tank through a cored-out passageway 44. This passageway 44 is provided with a branch 46 closed at its outer end by a plug 48 as shown in FIG. 4.

A sight glass 50 which may be formed of Pyrex or the like is shown in FIG. 4 as supported between the two end plates, having its opposite ends seated within cored-out openings provided in the end plates, and within which openings sealing gaskets 52 are disposed adjacent the opposite ends of the sight glass. Tubular sections 54 are also shown as providing communication by the interior of the sight glass with the cored-out passageways 32 and 46, hereinafter referred to, which passageway communicates as shown with the interior of the tank.

A highly important feature of this charging cylinder assembly is the provision of a refrigerant volume-pressure relationship chart indicated as 56 and shown partially in FIG. 1 and FIG. 4. By use of this chart this equipment will permit one to compensate for volume fluctuations of the refrigerant used, which volume fluctuations result from temperature changes. The temperature dictates the pressure, and the pressure in turn dictates the volume of the refrigerant. The chart 56 is shaped in the form of a tube or open-ended cylinder as shown in the drawings. This cylinder is supported between opposite ends of the end caps 12 and 14 upon shoulders 58 provided on said end caps as shown particularly in FIG. 4. This cylindrical chart is so supported between the end caps as to permit of free rotation therebetween about the tank 10 and the sight glass 50, all as hereinafter more particularly described.

The cylindrical chart 56 is preferably formed of a tough, fracture-resistant transparent plastic material. Acrylic resin is a suitable material for the chart. Upon this chart is inscribed the data shown in FIG. 6. The character and purpose of this data is hereinafter set forth. It should be presently noted that the tubular chart or shield 56 which encircles the tube and sight tube provides a space within the shield about the cylinder and sight tube. Should the pressure within the tank rise to the point that an explosion or leakage might result, the O-rings 16 and/or 52 will yield first sufficiently to permit the escape of gas under pressure prior to the gas pressure reaching the point of exploding the tank itself. Such gas under pressure escaping into the space between the cylindrical wall 10 of the tank and cylindrical shield 56 is permitted to escape through cut-out openings 60 in the inner faces of end caps 12 and 14.

Referring again to the volume-pressure chart, it is noted that this is one of the important features of the instant invention. It is because of the character of his chart and its association with other elements of the mechanism that it is possible to quickly meter under different temperature conditions accurate increments of refrigerant and discharge same into a refrigerating system. The chart itself, as heretofore specified, may be formed of transparent plastic upon which a series of calibrations or indicia are silk-screened or otherwise marked. The chart shown is designed to serve for three different fluid refrigerants. For each of the three fluid refrigerants there are a plurality of scales indicating the volume of such refrigerant at different fluid pressures. Each scale comprises a vertical column indicating at the bottom of the column the particular refrigerant being measured thereby and at the top of the column the pressure of such refrigerant within the tank.

It will be observed that the figures are arranged in a series of parallel vertical columns or scales. At the bottom of each column appears a numeral which indicates the type of refrigerant measured by such column. Different fluid refrigerants are used. This particular chart is designed for three types of refrigerant gas known in the trade as "Freon." At the top of the chart at the left, there is listed "Freon 114," "Freon 12," and "Freon 22." At the base of each vertical column of the chart there appears one of these numbered "Freons," namely, "114," "12," or "22." The first four vertical columns, commencing at the left, form a scale designed for "Freon 114." Continuing, the next five columns comprise a part of a scale designed for "Freon 12." In connection with the group for reading increments of "Freon 12" delivered, it will be noted that there are other columns which relate to "Freon 12" in addition to the five columns just mentioned. In other words, columns 11, 13, 15, and 17 all relate to "Freon 12." The columns beginning with 18 and continuing to the end of the chart at the right all relate to "Freon 22."

On the actual chart, the columns indicated by "114" are colored, as for example with the color green. The columns designed for "Freon 12" are colored by another color, as for example black, and the columns provided for "Freon 22" are colored with a third color, as for example red. It is obvious that any colors might be used or no designation made as to color. It is purely for clearness and expediting of reading that the colors are provided.

It is noted that there is a horizontal line of figures at the top of the chart reading 10–20–30–40– etc. up to 230. It will also be noted that one of these figures 10–20–30–40– etc. up to 230 superposes each vertical column of figures. This horizontal line of figures at the top of the chart are pressure indications as hereinafter described.

It will also be noted that at the bottom of each column of figures there is a large 0 with a horizontal line drawn therethrough. At the top of each column of figures is the numeral 40. The numeral 40 at the top of any column of figures indicates the level in the sight glass of 40 ounces of the particular "Freon" of such column at the pressure indicated by the particular figure of the horizontal line of figures at the top of the chart. In other words, the first column of figures at the left, which is for "Freon 114," would indicate that the line 40 at the top of the column is the height of the column 114 in the sight glass under 10 pounds of pressure per square inch upon the "Freon" within the tank. The pressure depends upon the temperature, and as the temperature goes up, the volume expands. If one considers for example column 4 from the left, which also relates to "Freon 114," it will be noted that the height within the sight glass of the liquid "Freon" within the tank is somewhat higher than that of column 1.

Each figure below 40 within any column from 40 down to 1 measures a one-ounce increment of that particular "Freon." The same explanation would apply to each of the other Freon specimens. For example, the first column to the left of the group which indicates "Freon 22," which is column 10 in the entire assembly of columns, shows a height for 40 ounces of such "Freon" at a pressure of 100 as read in the top line of pressures. This height is considerably higher on the sight glass than any of the columns relating to "Freon 114" and higher than any of the columns relating to "Freon 12." The chart, therefore, takes care of variations in temperature under which the device may be used and insures delivery of accurately measured increments of whatever "Freon" is employed by weight.

When the tank is to be filled with the particular "Freon" to be used, a delivery hose from a suitable container of such "Freon," in which container the "Freon" is under pressure is connected with the inlet 40 of the valve assembly shown in FIG. 4. "Freon" is then admitted from the container by opening the valve, and such "Freon" enters the tank 10. The exhaust valve 24 may be opened to permit air to be exhausted from the tank. When the indicator on the sight glass reaches the level of the 0, a pressure reading will be observed on the pressure gauge 28. The chart should then be rotated so as to bring that column of the chart corresponding to such pressure reading into alignment with the sight glass. When the height of the alignment in the sight glass reaches the numeral 40, it indicates level in the sight glass reaches the numeral 40, it indicates 40 ounces of "Freon" in the tank. At that point the valve will be shut off. If during delivery of "Freon" into the tank the pressure reading changes from 10 say to a pressure reading of say 20, the chart will be moved to bring the column indicated by the numeral 20 into alignment with the sight glass. The same procedure will be followed in connection with any numbered "Freon" which might be employed.

When "Freon" is to be discharge from the tank into a refrigerating system, a delivery hose will be similarly connected with the above part 40 and also connected with the intake to the refrigerating system. The column for the particular number of "Freon" being used and for the pressure indicated on the pressure gauge will be brought into registration with the sight glass through rotation of the chart, and the valve will then be opened to deliver the desired amount of "Freon" into the system. If 10 ounces of "Freon" were to be delivered, such delivery would be shown by the level falling from 40 to 30 in the particular column designed for the particularly numbered "Freon," and as indicated by the pressure column at the top of the chart corresponding with the pressure shown on the pressure gauge.

It is obvious that any type of suitable refrigerant might be employed but that the chart would have to be calibrated for such particular type of refrigerant.

What I claim is:

1. In a refrigerant charging tank assembly, a tank adapted to receive and to contain fluid refrigerant under pressure, such tank provided with a controlled discharge outlet, a sight glass communicating with the interior of the tank to indicate the fluid pressure of the refrigerant within the tank, a refrigerant pressure-volume chart bearing a plurality of indicia scales, each of which scales indicates in determined increments determined amounts of refrigerant under a determined fluid pressure, said chart and sight glass being so supported with respect to each other as to be relatively shiftable to bring any one of said scales into position to be read against the sight glass, said chart being of a tubular shape and surrounding said sight glass.

2. In a refrigerant charging tank assembly, a tank adapted to receive and to contain fluid refrigerant under pressure, said tank provided with a controlled discharge opening, a sight glass communicating with the interior of the tank to indicate the refrigerant level within the tank, a fluid pressure gauge communicating with the interior of the tank to indicate fluid pressure of the refrigerant within the tank, a refrigerant pressure-volume chart bearing a plurality of indicia scales, each of which scales indicates in determined increments determined amounts of refrigerant under a determined fluid pressure, said chart being of a tubular shape and surrounding such tank and supported for rotatable shiftable movement thereabout to bring any one of the scales into position to be read against the sight glass.

3. In a refrigerant charging tank assembly, a tank adapted to receive and to contain fluid refrigerant under pressure, said tank provided with a controlled refrigerant discharge outlet, a sight glass communicating with the interior of the tank to indicate the refrigerant level within the tank, a fluid pressure gauge communicating with the interior of the tank to indicate fluid pressure of the refrigerant within the tank, a refrigerant pressure-volume chart, said chart being cylindrical in shape and formed of transparent material and having imprinted thereupon a plurality of scales, each of which scales indicates in determined increments determined amounts of refrigerant under a determined fluid pressure, said chart supported in encircling relationship about the tank and sight glass and rotatable thereabout to bring any scale into position to be read against the sight glass.

4. A refrigerant charging tank assembly as defined in claim 3 characterized in that said chart is formed of tough fracture-resistant transparent material.

5. A refrigerant charging tank assembly as defined in claim 2 characterized in that said chart is formed of a tough fracture-resistant transparent material and has said scales imprinted thereupon in a succession of vertically disposed parallel columns.

6. A refrigerant charging tank assembly as defined in claim 3 characterized in that said tank is provided with end caps closing the ends thereof, said caps extending radially beyond the side wall of the tank, and further characterized in that opposite ends of said cylindrical chart are supported upon those portions of the end caps which extend beyond the tank and are supported spaced from the side wall of the tank.

7. A refrigerant charging tank assembly as defined in claim 3 characterized in that said tank is provided with end caps closing the ends thereof, said caps extending radially beyond the side wall of the tank, and further characterized in that opposite ends of said cylindrical chart are supported upon those portions of the end caps which extend beyond the tank and are supported spaced from the side wall of the tank, and characterized further in that openings are provided through said end caps for escape of fluid under pressure from the space between the tank and said cylindrical chart.

8. A refrigerant charging tank assembly comprising, in combination, a cylindrical upright tank having a bottom end cap and a top end cap, each projecting diametrically beyond the cylindrical side wall of the tank, tension rods extending between the end caps beyond the cylindrical side wall of the tank, holding the end caps tightly against the opposite ends of the cylindrical tank, sealing means interposed between opposite ends of the tank and the end caps, an upright sight glass extending between the end caps and communicating with the interior of the tank at opposite ends, a pressure relief valve communicating with the interior of the tank, valve means communicating with the interior of the tank controlling the discharge of fluid refrigerant therefrom, a volume-pressure chart of cylindrical shape provided with a plurality of indicia scales, each of which scales indicates determined increments of liquid refrigerant under a determined pressure, said chart being disposed and rotatably supported between those portions of the end caps which project beyond the side wall of the tank for rotatable shiftable adjustment about the tank and sight glass to bring different scales into position for reading upon the sight glass, each of said scales being arranged in a vertical column substantially to the axis of the chart, the space between the tank and the cylindrical shaped chart being provided with a fluid pressure discharge opening leading to the atmosphere.

9. A refrigerant charging tank assembly as defined in claim 8 characterized in that each vertically disposed scale column has associated therewith a marking indicating the particular refrigerant to be measured by said scale column and another marking indicating the pressure under which said particular refrigerant disposed within the tank answers to the scale figures which constitute the column.

10. In a refrigerant charging tank assembly, a tank adapted to receive and to contain fluid refrigerant under pressure and provided with a controlled refrigerant discharge opening, a sight glass communicating with the interior of the tank to indicate the refrigerant level within the tank, a fluid pressure gauge communicating with the interior of the tank to indicate fluid pressure of the refrigerant within the tank, a refrigerant pressure volume chart provided with a succession of indicia scale columns, and means supporting said chart adjacent to the sight glass for revolvable movement shifting the chart laterally of the axis of the sight glass to bring successive scale columns into position to be read against the sight glass.

11. The invention as defined in claim 10 characterized in that said means supports the chart for revolvable movement along an arcuate path extending adjacent to the sight glass to bring individual scales into position to be read against the sight glass.

12. The invention as defined in claim 10 characterized in that said means supports the chart with a portion of the chart extending in front of the sight glass whereby the chart is between the sight glass and a person viewing the sight glass to determine the liquid level therein.

References Cited in the file of this patent

UNITED STATES PATENTS

| | | |
|---|---|---|
| 533,365 | Mallick | Jan. 29, 1895 |
| 2,239,221 | Dimmock | Apr. 22, 1941 |
| 2,896,420 | Smouse | July 28, 1959 |